Jan. 7, 1958　　　　　I. E. PRICE　　　2,818,892
SAWING MACHINE USING A PORTABLE ELECTRIC SAW
ON A TRACKWAY ENGAGING THE WORK
Filed June 16, 1955　　　　　　　　4 Sheets-Sheet 1

INVENTOR
IRA E. PRICE
BY *Justin E. Macklin*
ATTORNEY

Jan. 7, 1958     I. E. PRICE     2,818,892
SAWING MACHINE USING A PORTABLE ELECTRIC SAW
ON A TRACKWAY ENGAGING THE WORK
Filed June 16, 1955     4 Sheets-Sheet 2
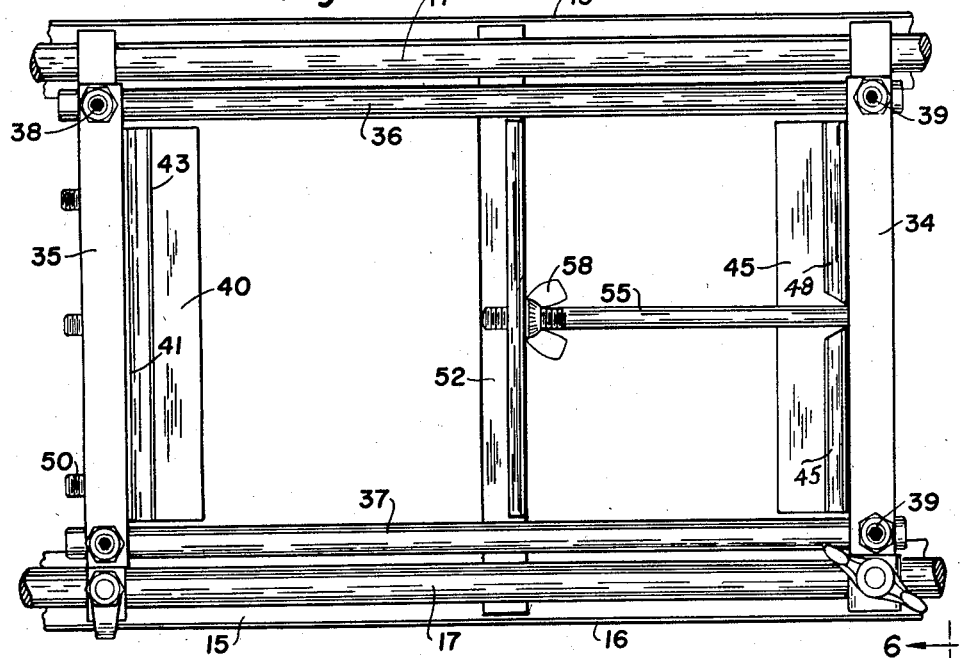
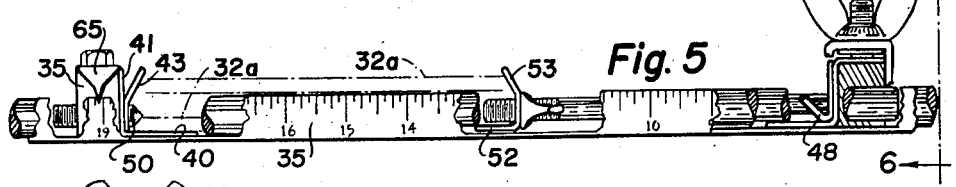
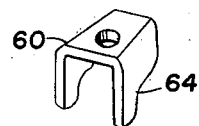
INVENTOR
IRA E. PRICE
BY *Justin L. Macklin*
ATTORNEY Jan. 7, 1958     I. E. PRICE     2,818,892
SAWING MACHINE USING A PORTABLE ELECTRIC SAW
ON A TRACKWAY ENGAGING THE WORK Filed June 16, 1955     4 Sheets-Sheet 3

INVENTOR
IRA E. PRICE
BY
ATTORNEY

Jan. 7, 1958 I. E. PRICE 2,818,892
SAWING MACHINE USING A PORTABLE ELECTRIC SAW
ON A TRACKWAY ENGAGING THE WORK
Filed June 16, 1955 4 Sheets-Sheet 4

INVENTOR
IRA E. PRICE
BY
ATTORNEY

United States Patent Office 2,818,892
Patented Jan. 7, 1958

2,818,892

SAWING MACHINE USING A PORTABLE ELECTRIC SAW ON A TRACKWAY ENGAGING THE WORK

Ira E. Price, Cleveland, Ohio

Application June 16, 1955, Serial No. 515,916

4 Claims. (Cl. 143—6)

This invention relates to improvements in portable sawing machines in which portable motor driven circular saws are used, and includes means for so mounting the power driven saw unit with relation to work holding means that a wide variety of transverse, longitudinal and miter cuts may be cut in the work with great precision, accuracy, speed, and efficiency while assuring maximum safety.

A further object is to so construct such saw mounting and work holding means as to be comparable in efficiency and accuracy to larger mechanically controlled powered circular saw devices.

A further object is to so construct such a device that it may be cheaply manufactured, simple to operate, and durable in use, and may be easily carried by the user.

A still further object is to so design the work holding and adjustable saw carrying means that it may be used a bench saw and may be operated either horizontally or vertically, and in the latter use it may effect pronounced saving in floor space, while being used efficiently for cutting large area boards or sheets.

More specific objects are so relating the work engaging and clamping means to the adjustable power saw mounting means that they may be rigid and secure while performing sawing, grooving, rabbeting, and other shaped cuts.

Other objects of my invention will become apparent in the following specification which relates to the accompanying drawings in which I have illustrated a preferred embodiment of the present invention, and in which:

Fig. 4 is a fragmentary view of a portion of the motor and saw carrying frame and securing means;

Fig. 5 is a fragmentary sectional view in the nature of a side elevation of the same;

Fig. 6 is a transverse section taken on a plane indicated by the line 6—6 of Fig. 5;

Fig. 7 is a detail perspective of a clamping or locking member;

Figure 1:
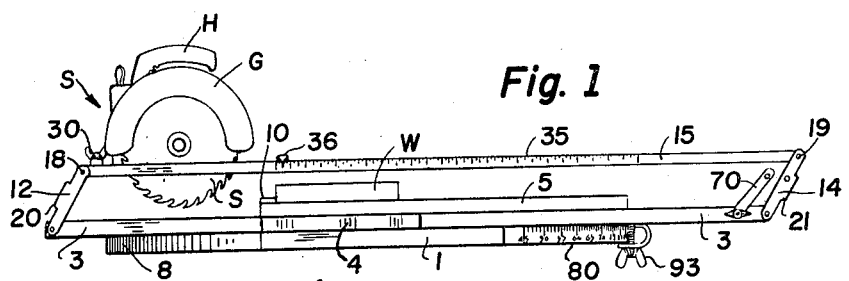
Fig. 1 is a side elevation of the machine including the portable power saw mounted thereon.
Figure 2:
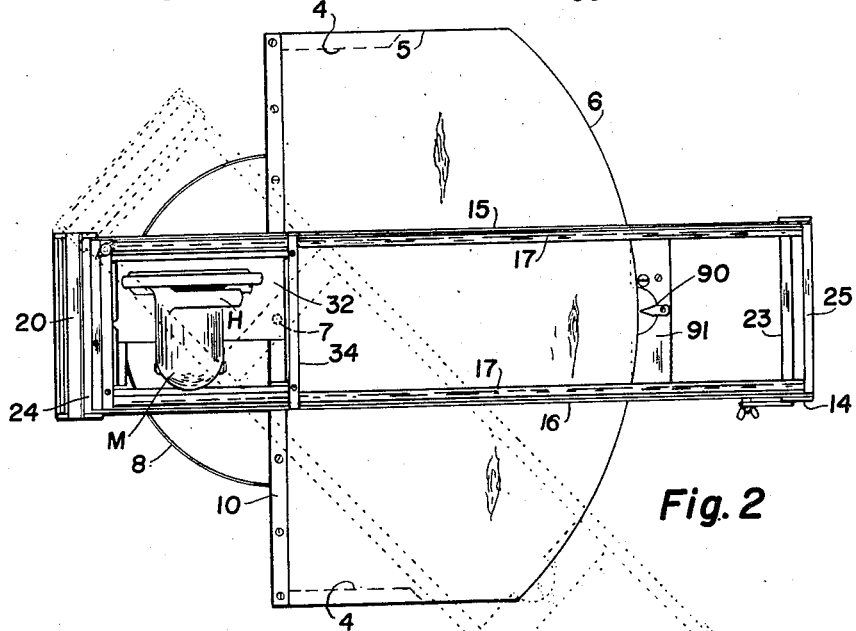
Fig. 2 is a plan view of the machine.
Figure 3:
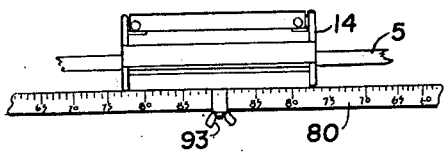
Fig. 3 is a fragmentary view in elevation showing the work holding carrier and angle indicating scale.
Figure 9:
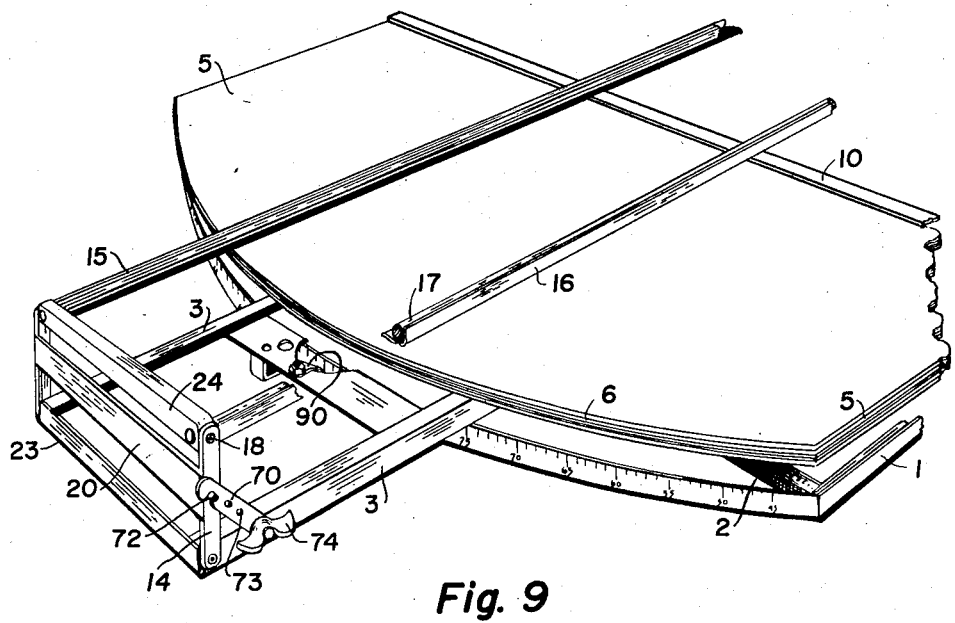
Fig. 9 is a perspective view of the work carrier table and clamping means.

A base frame comprises parallel angle bars 1 suitably connected by cross members, one of which is indicated at 2 in Fig. 9. Above the frame 1 are parallel bed rails 3 of a swinging frame, freely movable under a work carrying table 5, here shown as having its forward edge 6 curved about a pivot 7 (Fig. 2) which connects the work clamping and motor mounting means with the bed frame, as will be presently described. The table 5 is supported upon the frame 1 by spacers 4 (Figs. 1 and 2).

An arcuate strap 8 conforms in height to the rails 1 and is shown as semi-circular, and affords a supporting stabilizing member beneath the swinging rails 3.

Assuming that a work piece W (Fig. 1) is to be clamped on the table 5, it is brought against a transverse strap 10 rigidly secured to the table 5 and presenting a guide shoulder to one edge of the board or work piece W.

At the ends of the rails 3 of the lower swinging frames are pivoted parallel supporting links 12 and 14, which, in turn, are connected to work clamping and guiding rails 15 and 16, shown as comprising angle members and round rods 17. The angle members in turn are pivoted as shown at 18 and 19 to the pairs of end links 12 and 14. For rigidity these end links are rigidly connected by cross members, such as indicated at 20 and 21, positioned intermediately of the cross braces 23 and 24 which are rigidly connected to the ends of the bars 3, and 15 and 16, respectively.

I have thus provided a rigid rectangular frame comprising the parallel members 3 and 23. This swinging frame rests upon the base frame comprising essentially the members 1 and 2, while above the table 5 the similar rigid frame, comprising the parallel rails 15 and 16 and end members 24 and 25, is movable on the parallel links 12 and 14, whereby the upper frame may move upwardly to permit insertion of the work thereunder and onto the table and then be clamped by this upper frame, the clamping action being permitted by the swinging of the links 12 and 14 downwardly to bring the rails firmly into contact with the work piece.

These upper and lower connected frames are thus maintained in parallelism after the fashion of parallel rulers. Thus, as they are moved upwardly and downwardly, swinging about the pivot links 12 and 14, connecting them at their ends, obviously parallel relationship being maintained, a clamping pressure may be applied uniformly by the bottoms of the rail members 15 and 16 to the upper surface of the work piece W, such as a board. This clamping action firmly holds the work in clamped position against the positioning back up rail 10 and presses it downwardly onto the table 5. This firm clamping and gripping action is important in assuring accuracy of work and in further assuring safety in effecting the cut by the motor driven saw or tool.

The portable saw and motor unit S is mounted on a plate 32, and it is desirable to provide an intermediate carrier slidable along the rods 17, within the angle rails 15 and 16, and which may be clamped thereto for supporting the motor unit at different positions for rip sawing at different spacing from the back up shoulder guide 10. For this rip sawing operation, it is desirable to provide for turning the saw transversely of the upper frame and its rails, that is, at right angles to the position and direction shown in Figs. 1 and 2.

The saw supporting sub-frame is therefore specially designed to clamp the motor and saw supporting plate 32 in either of its two positions; namely, with the saw parallel to the longitudinal rails 15 and 16, or transversely thereof.

The motor supporting plate 32 is shown as having parallel ends and sides and considerably narrower in width than its length.

The saw carrying sub-frame is shown as comprising cross members 34 and 35 having transverse openings at the bottom sides thereof, slidably embracing the rods 17, and these cross members 34 and 35 are held in spaced relation by inner round rod-like rail members 36 and 37 extending through openings in the cross bars 34 and 35, and adjustably rigidly clamped thereto, as by set screws indicated at 38 and 39.

Fixed on the bar 35 is an angle supporting strip having a horizontal shelf-like portion 40 and a portion 41 lying against and secured to the bar 35. An angle strip 43 is rigidly secured to the vertical portion 41 and projects inwardly of the frame as shown in Figs. 4 and 5.

Figure 8:
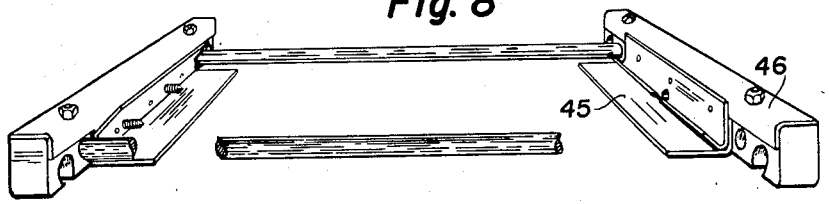
Fig. 8 is a fragmentary perspective view of the intermediate portion of the motor and saw carrying frame and clamping means.

A similar supporting shelf 45 is formed of an angle bar and projects horizontally from the lower portion of the cross bar 34, and which may in turn be shaped to extend upwardly and over the same as indicated at 46 in Fig. 8.

Normally the ends of the flat metal plate 32 (Fig. 2), forming the base for the saw unit, rest upon the shelf-like flanges 40 and 45, and adjacent the bar 34 it projects under outwardly sloped acute angle flange members 48 (Fig. 5), while at its end adjacent the bar 35, it rests upon the shelf flange 40. Here, cone pointed set screws 50 engage the upper edge of the plate, here indicated by the lower broken line 32a in Fig. 5. Thus, the motor support may be held by two of these cone pointed clamping screws, permitting the plate to stand at the position shown in Fig. 1, or to be moved over and similarly clamped at the opposite side of the carrier frame or be intermediately positioned.

To mount the saw in the crosswise rip-saw position, the carrier plate 32 is turned laterally, and a cross channel bar having a flat shelf-like flange 52 may bridge across and slide upon the lower flanges of the angle rails 15 and 16 intermediately of the end bars 34 and 35 of the motor support frame. When in this upper position the plate 32 rests upon the rods 36 and 37, and the opposed acute angle flange 43 at the shelf 40, and a similar angle flange 53 of the cross member 52, may engage the motor plate here indicated in parallel dot and dash lines 32a in Fig. 5.

A jack screw rod may be inserted in the cross bar 34, as shown at 55, and project through an upright portion of the member 52, and threads on the inner end of this jack screw provide for clamping the bar onto the motor plate 32 by a wing nut 58.

It is desirable to firmly clamp the motor carrier frame to the longitudinal frame rods 17 which are rigidly mounted within the frame angle members 15 and 16, and for this purpose I provide a saddle-like clamp 60, shown in Fig. 7, which may embrace the ends of the bar 34, while a screw 61 (Fig. 6) may receive a wing nut 62 for urging it downwardly, thus pressing notch portions 64 into tight engagement with the rod 17 at either side of the bar 34.

At the end of the bar 35, I may secure a pointer indicated at 65 (Fig. 5) which extends over the graduations on the scale 35, for convenient measuring of rip-saw spacing.

The composite saw and motor unit S (Figs. 1 and 2) may comprise a motor M and saw guard G with the usual handle H projecting above the same, and with provision, not shown, for securely clamping it to the mounting plate 32, while the saw S projects a desired distance below the upper carrier frame to bring its circumference into approximate alignment of the top plane of the table 5. Inasmuch as different forms and sizes of saws may be used, the convenience of having the top frame swing upwardly and then downwardly to clamp upon different thicknesses of work material will be apparent.

For ripping operations it may be assumed that the board is manually moved longitudinally over the table 5, parallel to the guide rail 10, and for this purpose it is desirable to hold the upper frame and saw unit at different heights. Accordingly, I provide a track lock brace indicated at 70 (Figs. 1 and 9) which is shown as having a hook portion adapted to engage a pin 72 on the link frame 14 and be secured by a wing nut 74 pivoted to the lower rail 3. Additional spaced holes 73 in the link 70 may be fitted over the pin 72 by releasing the wing nut and again clamping it after passing the selected hole over the pin 72. Thus, the top frame is braced and securely held in the position permitting the work board, or the like, to be slid freely under the top frame with the saw in its transverse and selected position for the desired width.

For cross-cutting and mitering, the saw would normally be in the position shown in Figs. 1 and 2. The clamp 60 would be released, permitting the motor sub-frame to slide freely along the rods 17. For accurate cross-cutting as well as for accurate angle mitering, I have provided an arcuate scale 80, secured at its ends to the outer corners of the base frame members 1, and preferably of a height such that it forms additional support for the rails 3, and thus for the table 5, as does the arcuate support band 8.

A pointer indicated at 90 (Fig. 2) is secured on a cross member 91 fixed to the rails 3, while a clamp including a wing nut 93, which may be positioned as shown in Fig. 1 where room permits, may hold the frame in any angular position, either way from the position shown in solid lines to one such as indicated in dotted lines in Fig. 2.

The saw may also be mounted to turn on an axis presenting the plane of the saw at an angle to the support table and clamping frames. This provides for cutting a compound bevel, when desired.

Figure 10:
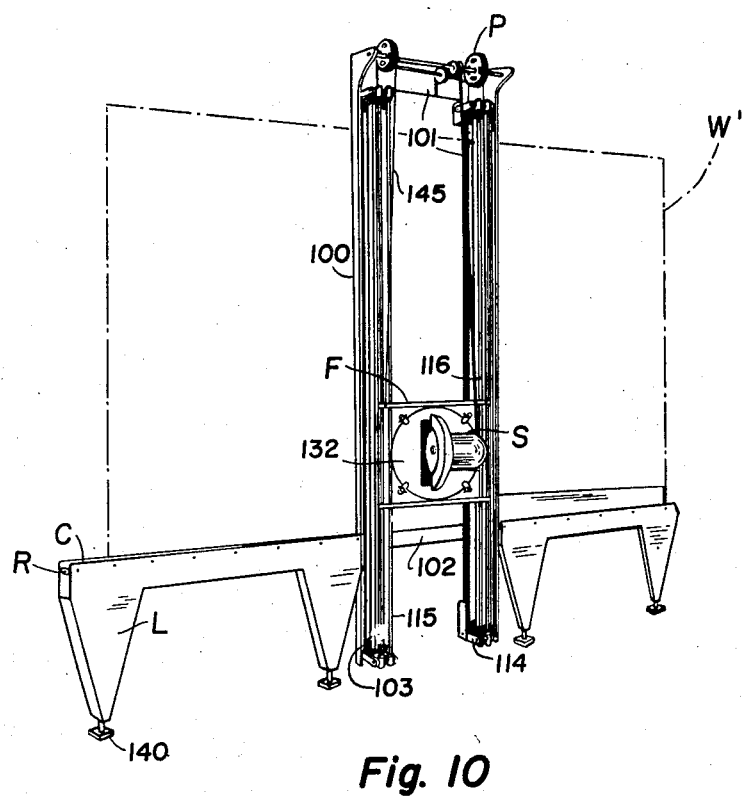
Fig. 10 is a perspective view of a modified form of the saw carrier and work clamping means adapted for mounting in an upright position.

Referring to the modified form of Fig. 10, the arrangement there shown is particularly useful and effective in sawing large panels such as plywood sheets. It is intended to stand vertically, for example, against a wall, thus saving floor space while permitting speedy and accurate cutting of such hard to handle large work pieces.

As shown, a rigid frame 100 comprises parallel bars corresponding to the base members 1 of the form previously described. These upright bars or base rails may be connected by cross members 101 and 102 to form a rigid frame. This frame may be secured to a vertical wall or to any suitable support. On these members are the parallel work-gripping members 103 and rails 115 and 116 which correspond to the bars 15 and 16 of Figs. 1, 2 and 9, and which support the saw carrier sliding frame, designated generally F, supporting the motor driven assembly, designated generally S, as before. These work-gripping members and rails are connected by parallel pivoted links as at 114, corresponding to the links of the horizontal form described. As indicated in Fig. 10, the motor and saw or cutting tool unit is mounted on a circular plate 132 which may be clamped in different angular positions.

Extending each way from the frame 100 and in alignment with the space between the parallel clamping members on the frame are guideway supports shown as constructed to form a guide channel C with rollers, such as indicated at R, and shown as having downwardly extending legs L with adjusting screws for perfecting mutual alignment, as indicated at 140. The motor carrying frame F may be raised or lowered by any suitable means.

I have shown pulley arrangements indicated at P with cords such as 145 by which the motor frame may be raised or lowered, preferably by the aid of counter weight for vertical movement sawing. Likewise, it may be positioned and suitably clamped, as before described, at different heights for horizontal sawing of large panels. The relative size of such a panel is indicated in broken lines at W'. The horizontal sawing is of course effected by moving the panel to be cut in the aligned supporting channels with relation to the saw.

From the foregoing description it will be seen that I have provided essentially a two-part frame with an interconnecting parallel linkage means for clamping the work piece. I have also provided for accurate angle cutting or mitering while maintaining rigidity and certainty during the cutting and handling of the work piece.

Further, it will be seen that I have provided a convenient, simple means for clamping the motor and saw support in either cross-cutting or rip-sawing position, with simple, effective means for securely holding the motor and saw unit in either of its positions.

The device is safe, and saw guards or tool guards are fixed with the removable power driven tool units which may be interchangeably mounted as described. The work or material being cut is firmly gripped and may be quickly released. These features contribute to accuracy, safety, and rapid cutting.

The large arcuate angle measuring scale is readily visible and facilitates easy setting for the desired angle of cut, and the machine as a whole is useful in the cutting of components and parts of structures made of sawable or workable materials used in framing and finishing of buildings, cabinets, furniture, etc.

It will be seen that in the modified form I have provided for space saving while effectively working both longitudinal and cross-sawing of large, hard to handle sheets, such as plywood.

Having thus described my invention, what I claim is:

1. In a sawing machine, the combination of a base frame, a table member thereon having a work supporting surface, a work clamping upper frame member above and parallel to the work supporting surface and base frame and means connecting the upper frame to the base frame including parallel pivoted link members at the ends thereof, a saw-carrying sub-frame for supporting a power driven saw unit, said sub-frame being slidably mounted upon the upper clamping frame, said upper frame serving to clamp and hold the work piece to the supporting surface while the motor and saw-carrying sub-frame is moved along the upper frame.

2. The sawing machine defined in claim 1 in which the saw-carrying sub-frame is arranged to engage and clamp the sides of a rectangular base on a power driven saw unit, and in which two separated clamping strip members are mounted on the sub-frame and adjustable with relation to each other and each having a surface sloping toward the other at an acute angle, and means are provided for holding the clamping strip members in engagement with the saw frame base with the plane of the saw unit positioned transversely with relation to the upper clamping frame member.

3. The structure defined in claim 1 in which the work piece clamping frame is also pivoted to the base frame to swing in a plane parallel to said base frame, an arcuate graduated scale is mounted rigid with the base frame, and a coacting indicator is carried by the pivoted frame for determining angle of cut.

4. The combination described in claim 1 in which the upper clamping frame and the base frame constitute parallel work clamping frames, and means is provided for locking the parallel work clamping frames in relative adjusted positions.

References Cited in the file of this patent
UNITED STATES PATENTS

| | | |
|---|---|---|
| 1,584,086 | Fonda | May 11, 1926 |
| 1,832,283 | Earhart | Nov. 17, 1931 |
| 2,347,359 | Miller | Apr. 25, 1944 |
| 2,396,961 | Meredith | Mar. 19, 1946 |
| 2,559,283 | Dick | July 3, 1951 |
| 2,589,554 | Killian | Mar. 18, 1952 |
| 2,595,322 | Avery | May 6, 1952 |
| 2,633,162 | Neuenschwander | Mar. 31, 1953 |
| 2,677,399 | Getsinger | May 4, 1954 |
| 2,708,463 | Coleman | May 17, 1955 |
| 2,739,624 | Haddock | Mar. 27, 1956 |
| 2,741,277 | Legar | Apr. 10, 1956 |